United States Patent [19]
Ophir et al.

[11] 3,970,989
[45] July 20, 1976

[54] DATA TRANSFER ERROR CHECK

[75] Inventors: David Ophir, Melville; Marvin Shapiro, Huntington; Bruce Komusin, Middle Island, all of N.Y.

[73] Assignee: Ontel Corporation, Plainview, N.Y.

[22] Filed: Mar. 6, 1975

[21] Appl. No.: 555,944

Related U.S. Application Data

[62] Division of Ser. No. 448,759, March 6, 1974, Pat. No. 3,921,148.

[52] U.S. Cl. .................................... 340/146.1 AG
[51] Int. Cl.² ......................................... G06F 11/10
[58] Field of Search .......... 340/146.1 AG, 146.1 AL

[56] References Cited
UNITED STATES PATENTS

| | | | |
|---|---|---|---|
| 2,977,047 | 3/1961 | Bloch ....................... | 340/146.1 AG |
| 3,147,460 | 9/1964 | Scott ....................... | 340/146.1 AG |
| 3,418,630 | 12/1968 | Van Duuren .............. | 340/146.1 AL |
| 3,831,144 | 8/1974 | En ............................ | 340/146.1 AG |

*Primary Examiner*—Charles E. Atkinson
*Attorney, Agent, or Firm*—Morton, Bernard, Brown, Roberts & Sutherland

[57] ABSTRACT

A business machine for communicating with remote and/or local data devices. A multiplexer selects the device to communicate with the business machine and sequences the operation of the machine through its several steps under control of a central processing unit. Those data devices with which the business machine communicates on a party line are coupled to the multiplexer through a communications controller which detects Attention signal, requests access to the memory, and in response to acknowledgement of access, transfers characters between the data device and the memory. The controller receives a block check character but generates a modified block check character which simplifies the utilization of that check. A video display can be provided with the business machine. The business machine is organized to permit clearing of the display screen independently of clearing of the corresponding memory locations and to permit rapid scrolling of text on the display screen, even when a relatively low speed microprocessor is utilized for the central processing unit.

3 Claims, 11 Drawing Figures

DATA TRANSFER ERROR CHECK

This is a division of application Ser. No. 448,759, filed Mar. 6, 1974 and now U.S. Pat. No. 3,921,148.

The present invention pertains to a business machine. More particularly the present invention pertains to a business machine suitable for use in processing data in conjunction with data devices, including data sources, data processors and data utilizers, and including both remotely located and nearby data devices. The business machine of the present invention receives data from data devices, processes data, and applies data to the same or other data devices. In addition, if desired, the business machine of the present invention can provide an output display of data, for example on a cathode ray tube type display device, and can receive new input data from a local input device.

In numerous business applications it is desirable to be able to receive data from remote sources, process data and apply data to remote utilizers. In addition, it is often desirable to be able to display the data either on a printed hard copy or on a transient display device such as a cathode ray tube. As one example, a hotel might utilize a centralized date processing unit for maintaining the accounts of its various registered guests. Into this central data processor would be applied data regarding the charges of a particular registered quest for his room, for restaurant meals, and for purchases made in various shops in the hotel. Each of these various service areas within the hotel thus would be equipped with a business machine in accordance with the present invention, permitting forwarding of the relevant data to the central processing unit as each registered guest made charges. The cashiers desk at the hotel likewise would have a business machine in accordance with the present invention, permitting it to receive information from the central processing unit to enable the printing of a bill at the time the registered quest checks out.

As another example, state motor vehicle registration information is frequently maintained on a data processing system. If it is desired to determine the registered owner and description of a vehicle having a particular license number, then the data processing system is interrogated to provide the information associated with the license number. In response to such interrogation the processing system provides the name, address, and physical description of the registered owner and the description of the vehicle. A large number of business machines in accordance with the present invention, located at widely scattered, often mobile, points are coupled to the data processing system to interrogate it and to receive information from it. Frequently it is desired that the output information from the motor vehicle registration data processing system be displayed on a video display device, such as a cathode ray tube, to permit rapid checking of a vehicle's registration.

There recently have been developed data processors which are formed of microcircuits and general purpose microprocessors and which are both flexible and economical. This development has made desirable the employment of these microprocessors as replacements for circuits employed in special purpose, limited application business machines. Unfortunately, the use of such devices has been limited, to an extent at least, because of their slow operating speed. Such devices have been suited primarily for use with batch-oriented terminals having limited communication capability. They have not become a part of communication-oriented business machines used with on-line data communication because the microprocessors are too slow to operate in the communication environment. Business machines generally require special circuitry and specially configured memories to enable display of data on a cathode ray tube type display device thus limiting their flexiblity and increasing their cost. Optimum flexibility and economics can result only if the microprocessor and a true general purpose memory are used to accomplish the functions associated with communnication-oriented terminals. It is inefficient use of a general purpose microprocessor to use special purpose memories and circuitry such as presently used in business machines having microprocessors.

As one illustration of the problems encountered in the use of such microprocessors in data terminals having cathode ray tube type display devices, consider the function of clearing the display screen. This screen clearing is generally done whenever a new message is to be displayed. Heretofore, this has been accomplished by clearing the data from each location in the display memory of the data processor to cause the display screen to show a clear display. Typically between 400 and 2000 data characters are involved. The time required for the clearing of this number of memory locations by a sequential general purpose computer system is generally in excess of the interval between transmission of the command to clear the screen and the transmission of the next data character intended for display. As a consequence, microprocessors have generally not been utilized in data display terminals that include cathode ray tube type display devices, and in those terminals which have utilized microprocessors, it has heretofore been necessary to provide sufficient time for clearing the display memory by utilizing some compensating technique such as inclusion in the data stream of numerous null characters between the clear screen command and the next data character, or such as utilization of buffer storage. Where the display consists of certain fixed information, such as headings on a form like an automobile registration information form, and variable information, the screen clearing process is even lengthier because of the necessity for the data processor to determine whether a character is a part of variable information which is to be cleared or whether it is a part of protected, fixed information which is not to be cleared.

An another example of the difficulties encountered in existing cathode ray tube type data displays, using a general purpose microprocessor, consider the scrolling of the displayed data. Usually new data is added to a display frame at the bottom line of the frame. Scrolling involves continuously shifting the data upward once the last line of the frame is filled so that the top line is deleted, the remaining lines moves upward, and new data inserted as the bottom line. This is analogous to the scrolling of a piece of paper out of a typewriter as lines are filled. Data terminals have accomplished this scrolling in the past by shifting the storage location within their memory of all the data characters to be displayed. This is a time consuming process for a general purpose microprocessor, and in particular it cannot be accomplished in the time available during display of on-line transmission.

Another problem encountered in making low-cost communication oriented business machines is communication with multiple peripheral devices. In low-cost machines in the past, such communication has been done sequentially. More costly data processing systems are capable of simultaneous communication with multiple peripheral devices, for example reading data from a magnetic tape and simultaneously printing data. Such multiple communication might be desired, for example, in a business machine utilized to obtain data concerning the bill of a hotel guest and to print that bill, or alternatively to obtain data concerning the bill of one hotel guest while simultaneously printing the bill for another guest. Less complex and less expensive devices have not been capable of such simultaneous communication, and so require more time to accomplish communication with multiple devices.

The problems which have heretofore existed with the use of microprocessors in data display terminals including cathode ray tube type video displays are thus primarily the time required to clear the display and the time involved in data relocation functions that are needed for scroll techniques. The problems which have existed heretofore with the use of microprocessors in business machines intended for the communication environment are likewise primarily time problems due to the inability of such microprocessors to operate rapidly enough to accommodate data from on-line transmission sources.

The present invention is a business machine which utilizes a general purpose microprocessor and random access memory and which is capable of the rapid data handling that is required for use with on-line data transmission, high input/output speeds, and vieo display of data on cathode ray tube type display devices with screen clearing and scroll functions. In accordance with the present invention there is provided a business machine including a general purpose central processing unit, a multiplexer which couples that central processing unit to a plurality of data device controllers, each of which is associated with a particular data device, a video output processor together with a video display device, and a random access memory.

In the business machine of the present invention, memory locations are dedicated to each device controller and video output processor. In these memory locations, the central processing unit stores pointer and control information. The pointer information identifies the locations in the business machine memory at which data is to be stored during input operations and from which data is to be retrieved during output operations. The control information can specify particular termination conditions for an input or output operation or can specify operating conditions. The multiplexer retrieves the pointer and control information for each input/output operation to direct the necessary data transfers. The multiplexer operates as a background to the microprocessor operation on a memory cycle-steal basis. This memory pointer technique permits high speed transfer of data during multiple input/output operations, including on-line data transmission, and, when used in conjunction with a cathode ray tube type display device, permits rapid scrolling of the display.

In some applications a data device may communicate with several business machines on a party-line. In such communication, the identification of the particular business machine with which communication is to take place must precede the transmission of data characters. Often the identification or address characters are the same as data characters which might be included in a transmission. Therefore, the address information is preceded by an attention character which prepares the system to interpret an address. Every received character must be monitored to assure detection of the attention character so that the receiving equipment is alerted to interpret an address and not data. Next the address must be interpreted to determine the business machine to participate in the transmission. Continuous monitoring for the attention character is preferably accomplished by detection circuitry, since it would be uneconomical to perform this operation in a microprocessor. Heretofore, specially designed interpretation circuitry has alsso been used to interpret the address. However, since the address needs to be interpreted only following an attention character, in the business machine of the present invention the address interpretation is economically accomplished in the microprocessor. As a further feature, this technique permits ready changing of the business machine address.

It is desirable to have in any data transmission system a means for assuring detection of erroneous characters in the event noise during transmission causes an error such as losing of a data bit or generation of an erroneous data bit. One means frequently utilized for checking the correctness of data transmission is a block check character, such as a longitudinal redundancy character which is a parity check of corresponding bit positions for all data characters. Present equipment for accomplishing this must detect the characters indicating the beginning and the ending boundaries of the data characters. This, of course, requires special detection circuitry. Those existing devices which utilize hardware for this purpose are inflexible and expensive, while those utilizing software are slow. In the business machine of the present invention a modified block check character is utilized based on all the characters in the transmission, and then this modified block check character is corrected to provide the true block check character compatible with existing systems. Consequently, no equipment is required to detect the boundaries of the data characters, and the approach provides flexibility at moderate cost and speed.

On a cathode ray tube type of display, each display is made up of a number of display lines, each including a number of display characters. In a typical illustrative example, the display might include 20 display lines each including 80 characters, for a total of 1600 characters. In the business machine of the present invention, when the display screen is to be cleared, a masking code character is stored in the memory locations associated with the first character position of each display line. Upon encountering this masking code character during a display scan, the system blanks or inhibits the video signal to mask the data characters stored in memory for the balance of that display line. Consequently, the display is cleared by storing this one masking code character for every line of the display screen, rather than having to store a code character for each character position of the display screen. This results in a saving of time of approximately 80 to 1 in our typical example, since the masking code character needs to be stored only in one character location for each line rather than in each of the 80 character locations for each line. When a new data character is received for displaying at a character location, the microprocessor causes the masking code character to be shifted to the memory location for the next character space of the display line to cause masking of the data characters in memory for the balance of the display line while the new character is written into the proper character memory location. This masking technique continues during entry of new data for the balance of the display line, and when a new character is written into the last position of the display line, the masking of that display line ends. Consequently, the screen is cleared for the display of the new data as rapidly as that new data is received. When the display consists of fixed data, which is not to be cleared, and variable data, which is to be cleared, the fixed data is coded or tagged to indicate that it is to be protected and a modified masking code character is utilized to indicate that only non-tagged characters are to be masked. The system then inhibits the masking of this protected data.

These and other aspects and advantages of the present invention are more apparent in the following detailed description and claims particularly when considered in conjunction with the accompanying drawings in which like parts bear like reference numerals. In the drawings:

Figure 1:
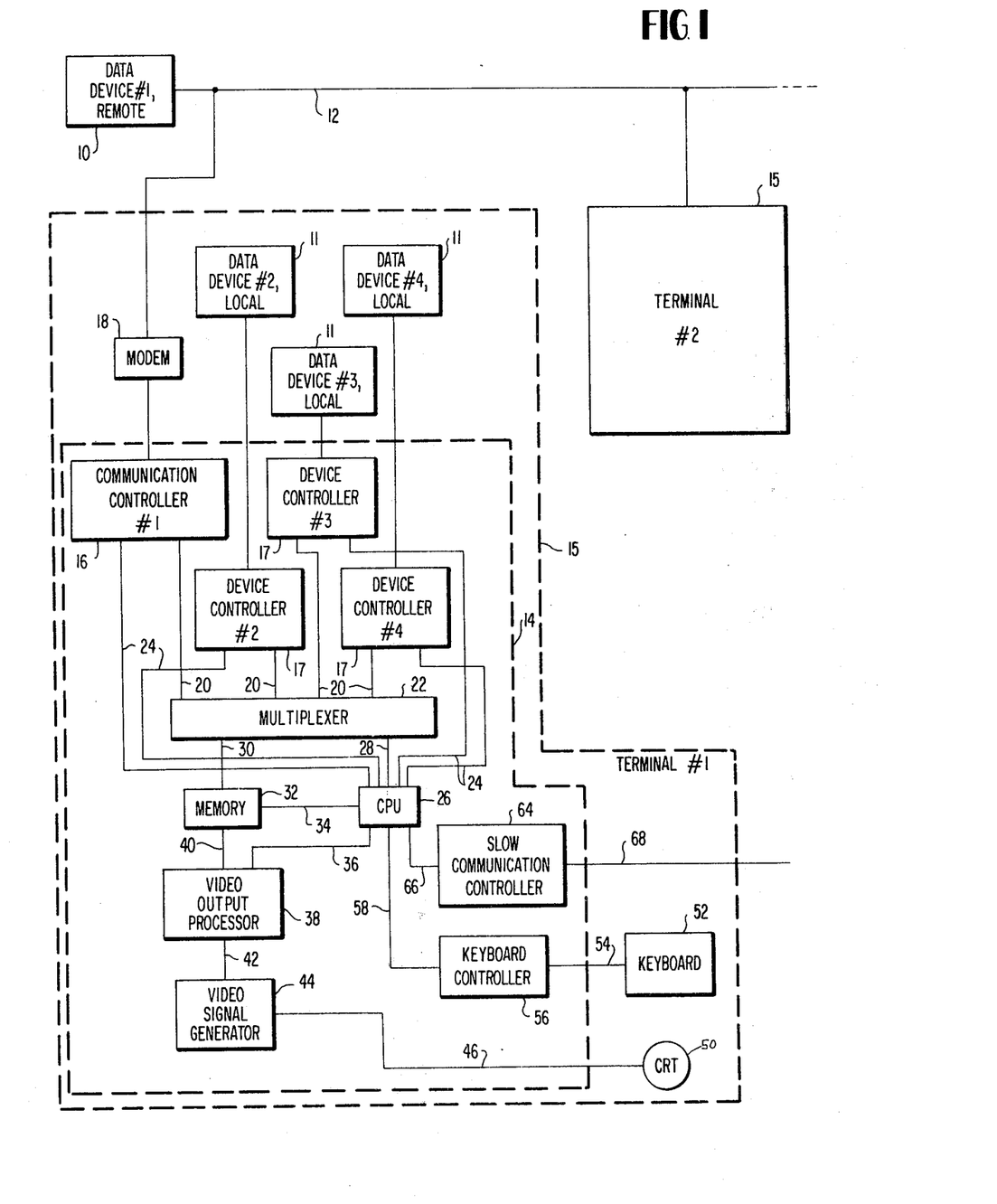
FIG. 1 is an overall block diagram illustrating a plurality of business machines in accordance with the present invention utilized in conjunction with a plurality of data devices.

FIG. 1 illustrates a data system including a number of business machines 14 in accordance with the present invention. Each business machine 14 can be incorporated with one or more local data devices 11 in a data terminal 15 and can likewise be coupled to one or more remote data devices 10. Any conbination of local and remote data devices might be incorporated into a data system including business machines in accordance with the present invention. Each data device 10 and 11 could be a data source, such as a teletype source or a computer output terminal. Alternatively, each data device 10 and 11 could be a data utilizer such as a computer input terminal or a data printer. Any combination of data sources and data utilizers might be incorporated into a data system including business machines in accordance with the present invention.

Remote data devices such as data device 10 are likely connected by a transmission line 12 to a number of data terminals 15 in a party line. In such event the coupling between transmission line 12 and each business machine 14 is preferably through a modem 18.

A communications controller 16 within business machine 14 is coupled to modem 18 for use with remote data device 10. Similarly a device controller 17 is coupled to each local data device 11. Each controller 16 and 17 is coupled by a line 20 to multiplexer 22 and by a line 24 to central processing unit (CPU) 26. Multiplexer 22 is connected by line 28 to CPU 26 and by line 30 to memory 32. Line 34 couples CPU 26 with memory 32. Each of the lines 20, 24, 28, 30 and 34, of course, might include a plurality of wires to interconnect several components within the various units, as needed.

In addition to communicating with the several data devices 10, business machine 14 can, if desired, communicate with a video display within terminal 15 to permit display of data from a data device 10 or 11, either as that data is received or after the data has been processed within CPU 26. In those business machines 14 having that capability, CPU 26 is coupled by line 36 to video output processor 38 which is also coupled to memory 32 by line 40. Video output processor 38 is connected by line 42 to video signal generator 44 which connects by line 46 to cathode ray tube (CRT) 50.

As an additional option, to permit input of data at terminal 15, keyboard 52 can be coupled by line 54 to keyboard controller 56 which connects by line 58 to CPU 26. In addition to permitting input of data to business machine 14, keyboard 52 permits modification of the manner of operation of CPU 26. As a further option, if desired, slow communication controller 64 can be coupled to CPU 26 by means of line 66 and can provide an output on line 68 to a slow communication device such as a teletype compatible device which might be a part of terminal 15 or which might be removed from the terminal.

Each business machine 14 is thus capable of two-way communication with any and all of the several data devices 10 and 11 to which it is coupled, and so each business machine 14 can receive data from any of its associated data devices 10 and 11, can process that data within its CPU 26, can provide data back to the associated devices 10 and 11, either returning the processed data to the same device or to a different device, and can output the data as received or as processed, providing the output on CRT 50 or on an output device coupled to output line 68. Business machine 14 is capable of substantially simultaneous communication with each of the several data devices 10 and 11 through multiplexer 22 under the control of CPU 26.

Each transmission of data on a party line between a remote data device 10 and a business machine 14 includes a number of characters, including both data characters and control characters. When a remote data device 10 is to communicate with a business machine 14, it first transmits an Attention character to alert all the business machines 14. The remote device 10 then transmits the address of the business machine 14 with which it is to communicate. In many line disciplines this is followed by transmission of a Start of Text character to inidicate that subsequent characters are data characters. Then the data characters themselves are transmitted, followed by an End of Text character to indicate that all of the data characters have been transmitted. If desired, there then can be transmitted a character designed to check the accuracy of the received data characters, for example, a Block Check character.

Figure 2:
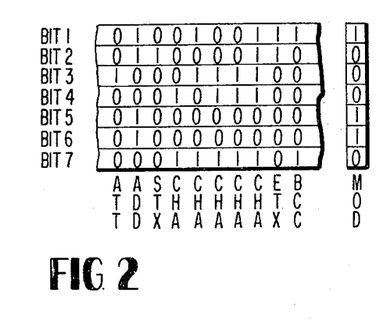
FIG. 2 illustrates a coded message transmission.

FIG. 2 illustrates a typical transmission. As illustrated in FIG. 2, the transmission is in a seven-bit binary code such as the ASCII code, described in the publication USA Standard Code for Information Interchange, publication USAS X3.4-1968, approved by the United States of America's Standards Institute Oct. 10, 1968. Preferably, an eighth-bit is included for control or parity check purposes. The transmission illustrated in FIG. 2 commences with an Attention character 0000100. The next character is an Address character, illustratively shown as 0110011. Then comes the Start of Text charaacter 0000010, followed by the data characters of the message. After the last data character, the End of Text character 0000011 is transmitted. If desired, this is followed by a check character, as described hereinafter.

Figure 3:
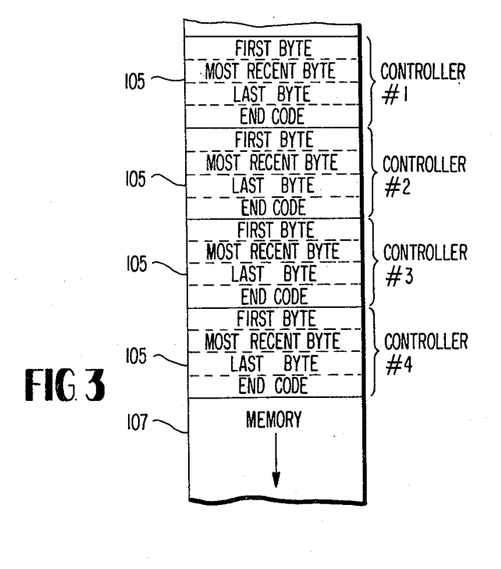
FIG. 3 illustrates the layout of a memory suitable for use in conjunction with a controller in accordance with the present invention.

FIG. 3 illustrates diagrammatically the lay-out of memory 32. Within memory 32 a portion 105 of four memory bytes is dedicated for use with each controller 16 or 17, and a portion 107 stores data characters. The first byte of each portion 105 stores the address within portion 107 assigned for storage of the first data character associated with that controller 16 or 17. Thus, if a message is to be received from a controller 16 or 17, business machine 14 interrogates the first byte of the portion 105 associated with that controller 16 or 17 to determine the address of the memory location within portion 107 at which the first character of the message is to be stored. The next byte of portion 105 stores the address of the most recently used memory byte of the memory storage locations within portion 107 associated with that controller 16 or 17 for storage of data characters. Thus, with each data character received from a controller in a message after the first data character, business machine 14 interrogates the second byte of the portion 105 associated with that controller to determine the address of the memory location within portion 107 at which that received character is to be stored. The third memory byte of portion 105 stores the address of the last memory location within portion 107 assigned to that controller for storage of data characters so that a comparison can be made to insure that the part of portion 107 which is assigned to that controller for character storage is not overflowed. The fourth byte of portion 105 stores an end of message code character utilized with the particularly controller associated with that portion 105 so that a comparison can be made with characters received to determine whether such a character indicates a condition which should result in the end of a message.

While FIG. 3 shows one byte utilized for storage of each address and for storage of the end code, the particular memory utilized and the address codes utilized may make it necessary to use two bytes for one or more of these. Thus, for example, if eight-bit bytes are utilized in portion 105 and each address has fourteen bits, then two bytes would be required to store each address, with two or more bits remaining for control purposes.

Figure 4:
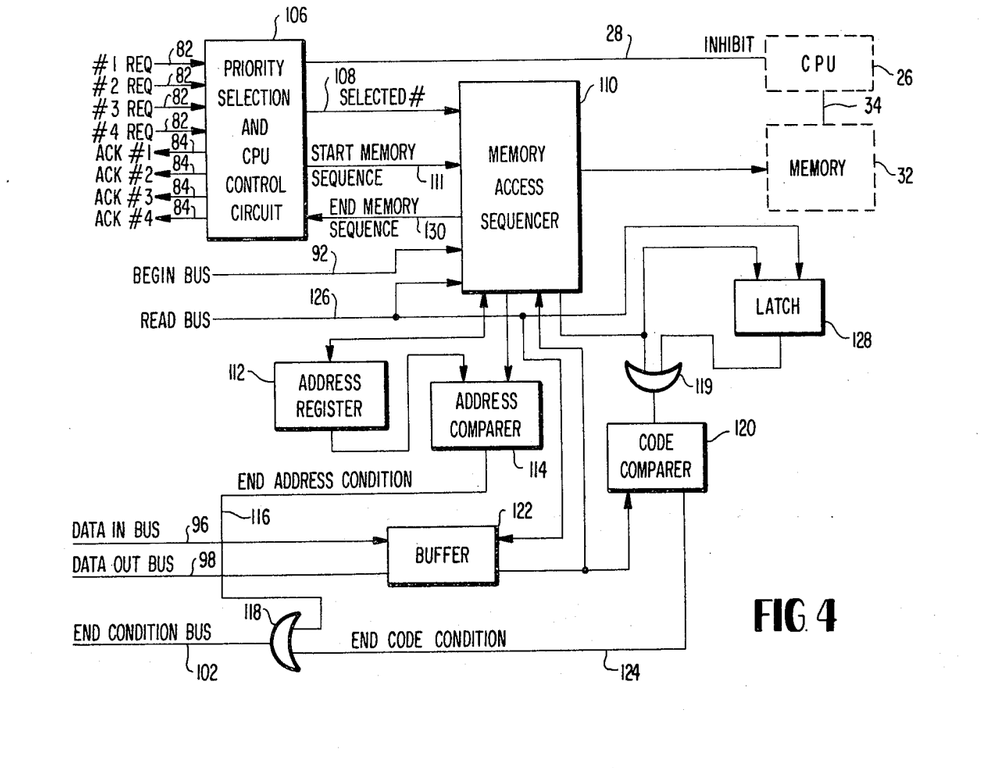
FIG. 4 is a block diagram of a multiplexer suitable for use in conjunction with the present invention.

FIg. 4 illustrates in block diagram form circuitry suitable for use as multiplexer 22. Whenever a data character is to be transferred between a controller 16 or 17 and memory 32, that controller applies a Request signal on a uniquely associated request line 82. The request lines from the several controllers 16 and 17 are connected to priority selection and CPU control circuit 106 within multiplexer 22. Should requests for access to memory 32 be present from more than one controller 16 or 17 simultaneously, circuit 106 selects the controller 16 or 17 to be served. This can be accomplished in any of several manners, and as one example the lowest controller number making a request can be given priority. THus, for example if requests are present simultaneously on the request lines 82 from controller number 1 and from controller number 3 of this business machine 14, then controller number 1 is given priority. If while that request is being serviced, a request is received from controller number 2, that request is given the next priority, with controller number 3 having to wait until no request is present from either controller number 1 or controller number 2. Other selection techniques could of course be utilized. Usually the device capable of the highest operating speed is given the first priority. The duration of each data character is long in comparison with the time required to transmit data between components of the sytem, and so no data bit will be lost even if it is from the controller 16 or 17 with the last priority.

Circuit 106 applies the number of the selected controller via line 108 to memory access sequencer 110. Circuit 106 also applies a signal to CPU 26 to suspend operation of the CPU while that data character is transferred. In addition, circuit 106 applies an Achnowledge signal to an acknowledge line 84 to the selected controller 16 or 17. When data characters are about to be transferred, circuit 106 applies a Start Memory Sequence signal on line 111 to memory access sequencer 110. If the data character to be transferred is the first character of a message, a Begin signal is present on begin bus 92, instructing memory access sequencer 110 to interrogate byte 1 of the memory portion 105 associated with the selected controller 16 or 17 to determine the memory address assigned for the storage of the first data character of a message from the selected controller. If there is no signal on the begin bus 92, then memory access sequencer 110 interrogates byte 2 of the associated portion 105 to determine the address of the most recent character associated with that controller. The address read from the interrogated byte is passed from memory 32, through memory access sequencer 110 to address register 112 which increments that address by one and applies the resulting address through memory access sequencer 110 to byte 2 of the associated memory portion 105 so that byte 2 then stores the address of the most recent character. Actually, since the incrementing takes place upon receipt of the address in address register 112, byte 1 of each memory portion 105 stores the address one less than the address of the beginning location assigned for the first data character so that upon this incrementing the desired address is in adddress register 112.

The contents of address register 112 are monitored by address comparer 114. Memory access sequencer 110 reads the contents of byte 3 of the associated memory portion 105 to determine the last character address assigned to the activated controller 16 or 17 and applies that address to address comparer 114. Should a comparison take place indicating that the address about to be utilized is the last address assigned for storage of characters by this controller 16 or 17, address comparer 114 applies a signal on end address condition line 116 through OR gate 118 to end condition bus 102. Should no comparison be found by comparer 112, no signal is generated on line 116. Memory access sequencer 110 next reads the contents of byte 4 of portion 105 which is the end code character. This character is applied through OR gate 119 to code comparer 120. If a character is to be written into memory 32, the character is received on data in bus 96 from the appropriate controler 16 or 17 and is stored in buffer 122. This character is then applied to code comparer 120 and to memory access sequencer 110 which writes it into the memory location now designated by byte 2 of memory portion 105. If code comparer 120 determines that the received character is the end code that has been retrieved from memory byte 4, it applies a signal on end code condition line 124 through OR gate 118 to end condition bus 102. If instead of writing data into memory 32, data is to be read from memory 32, a signal on read bus 126 is applied to memory access sequencer 110, data buffer 122, and latch 128. The end code retrieved from memory byte 4 is then stored in latch 128 which applies that code signal through OR gate 119 to code comparer 120. Subsequently, when the data from the memory location indicated by memory byte 2 is read into data buffer 122, it is applied, both to data out bus 98 and to code comparer 120. If comparer 120 determines that the character is the end code character, comparer 120 applies a signal on end code condition line 124, through OR gate 118 to end condition bus 102.

By utilizing both an end code character and an end address, a safety feature is provided. In the event noise in the transmission lines distorts the end code character so that the end code is not properly received and does not compare with that stored in mamory byte 4, still overflow of the memory is prevented, since the end address code prevents utilization of memory locations beyond that address. Consequently, storage does not spill over into other memory locations to erase previously stored messages from other controllers. If it is desired to utilize only the end address code to indicate the end of a data transfer, and not to utilize the end code, then the end address stored in byte 3 of portion 105 can include an additional control bit to inactivate the end code utilization, for example, by causing memory access sequencer 110 to skip interrogation of byte 4 of portion 105.

When the memory sequence has been completed, memory access sequencer 110 applies a signal on end memory sequence line 130 to circuit 106 to enable that circuit to respond to the next request. Circuit 106 then removes the inhibiting signal from line 28 to CPU 26.

Figure 5:
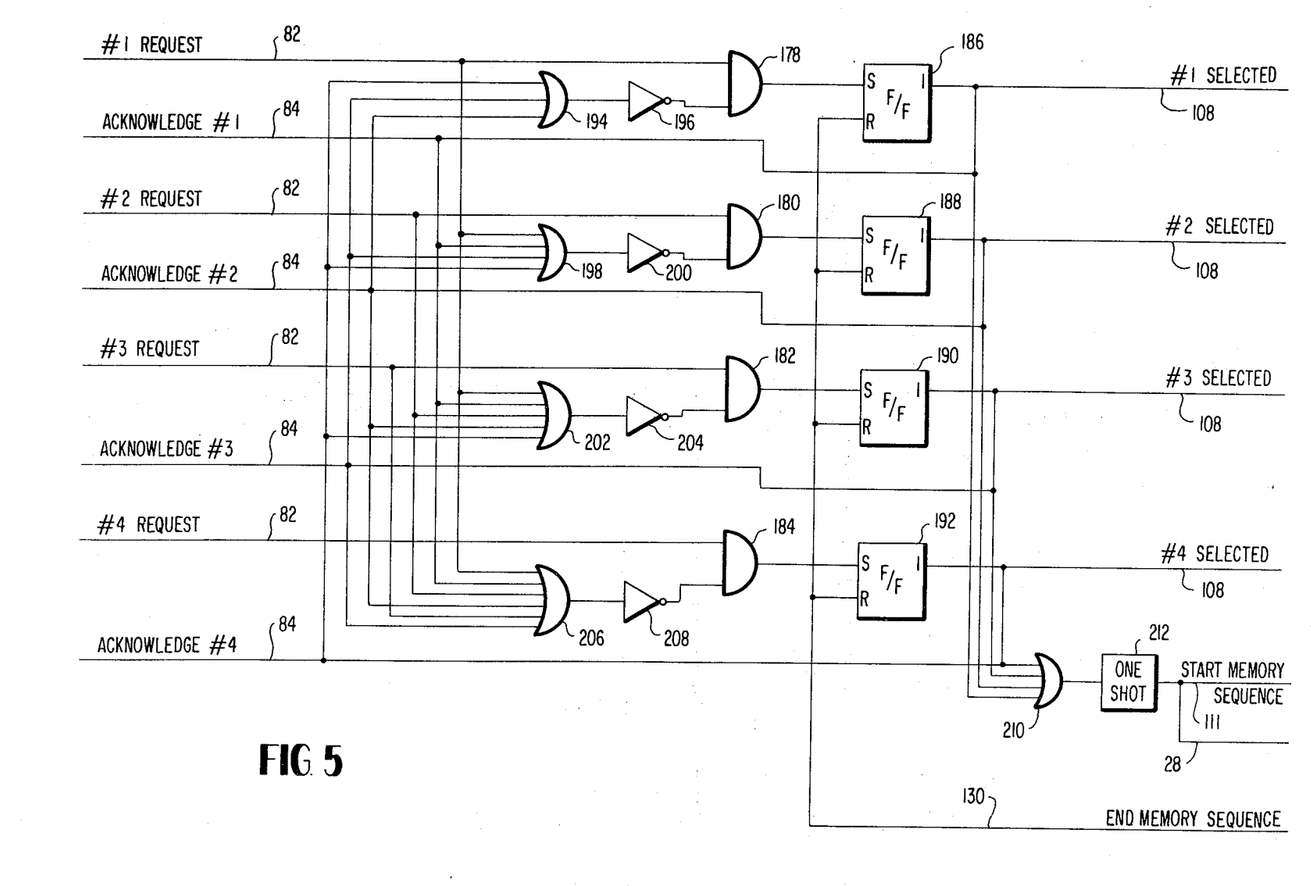
FIGS. 5 and 6 are block diagrams of circuitry which might be utilized as components of the multiplexer of FIG. 4.

Priority selection and CPU control circuit 106 might be any suitable device such as a series of gates and switches. FIG. 5 illustrates one approach to implementation of circuit 106. Number one request line 82 is applied to one input of AND gate 178. Similarly, the number two request line 82 is applied to one input of AND gate 180, number three request line 82 is applied as one input of AND gate 182, and number four request line 82 is applied as one input to AND gate 184. The output of AND gate 178 sets flip-flop 186, the one output of which is the Number One Selected signal applied from circuit 106 to memory access sequencer 110 by line 108. Likewise, the output of AND gate 180 sets flip-flop 188, the one output of which is the Number Two Selected signal applied to sequencer 110 on line 108. Similarly, the output of AND gate 182 sets flip-flop 190, the one output of which is the Number Three Selected signal applied by line 108 to sequencer 110, and the output of AND gate 184 sets flip-flop 192, the one output of which is the Number Four Selected signal applied to sequencer 110 via line 108. The one output of flip-flop 186 is also applied on line 84 to controller number one as the Acknowledge Number One signal. In a similar manner, the one output of flip-flop 188 is applied to line 84 to controller number two as the Acknowledge Number Two signal. The one output of flip-flop 190 is applied to controller number three as the Acknowledge Number Three signal on line 84, and the one output of flip-flop 192 is applied to controller number four as the Acknowledge Number Four signal on line 84.

OR gate 194 receives as inputs the Acknowledge Number Two, Acknowledge Number Three and Acknowledge Number Four signals, and applies its output through inverter 196 to the second input of AND gate 178. OR gate 198 receives as inputs the Acknowledge Number One, Acknowledge Number Three and Acknowledge Number Four signals, as well as the Number One Request signal, and applies its output through inverter 200 to the second input of AND gate 180. OR gate 202 receives as inputs the Acknowledge Number One, Achnowledge Number Two and Acknowledge Number Four signals, as well as the Number One Request and Number Two Request signals, and applies its output through inverter 204 to the second input of AND gate 182. OR gate 206 receives as inputs the Acknowledge Number One, Acknowledge Number Two and Acknowledge Number Three signals and the Number One Request, Number Two Request and Number Three Request signals and applies its output through inverter 208 to the second input of AND gate 184. The Number One Selected, Number Two Selected, Number Three Selected andn Number Four Selected signals are applied through OR gate 210 to the input of monostable multivibrator or one-shot 212, the output of which is the Start Memory Sequence signal applied on line 111 to memory access sequencer 110 and the inhibit signal on line 28 to CPU 26. If desired, the signal on line 111 can be gated by receipt of a control signal from CPU 26. The End Memory Sequence signal received on line 130 from memory access sequencer 110 is applied to the reset input of each of flip-flops 186, 190 and 192.

If circuit 106 has generated as Acknowledge signal to any of the controllers, that Acknowledge signal passes through the OR gates associated with the other controllers to block the associated AND gates. Thus, only one Request signal can be accommodated at a time. If a Request signal is received from controller number one, that Request signal passes through the OR gates associated with the other controllers to inhibit acknowledgement of a request from one of those other controllers. Likewise, if a Request signal is received from controller number two, that Request signal passes through OR gates 202 and 206 to inhibit acknowledgement of a request from controllers numbers 3 and 4. Similarly, a Request signal from controller number 3 passes through OR gate 206 to inverter 108 to block gate 184 so that a Request signal from controller number four is not acknowledged. Consequently, the priority is determined for the controllers. Receipt of a Request signal from a controller having priority over requests from other controllers results in setting of the flip-flop associated with the priority controller to generate the Selected signal and the Acknowledge signal for that controller, as well as to generate the Start Memory Sequence signal, while inhibiting the other controllers. That controller retains priority until the memory sequence has finished, at which time a signal on line 130 resets its flip-flop and permits selection of a request from another controller.

FIG. 5, of course, is only one illustrative manner in which circuit 106 might be implemented, and numerous other manners might be utilized. In addition, FIG. 5 only represents the logic, and design optimization may require addition of suitable time delays, isolation diodes, etc., as is well known in the art.

Figure 6:
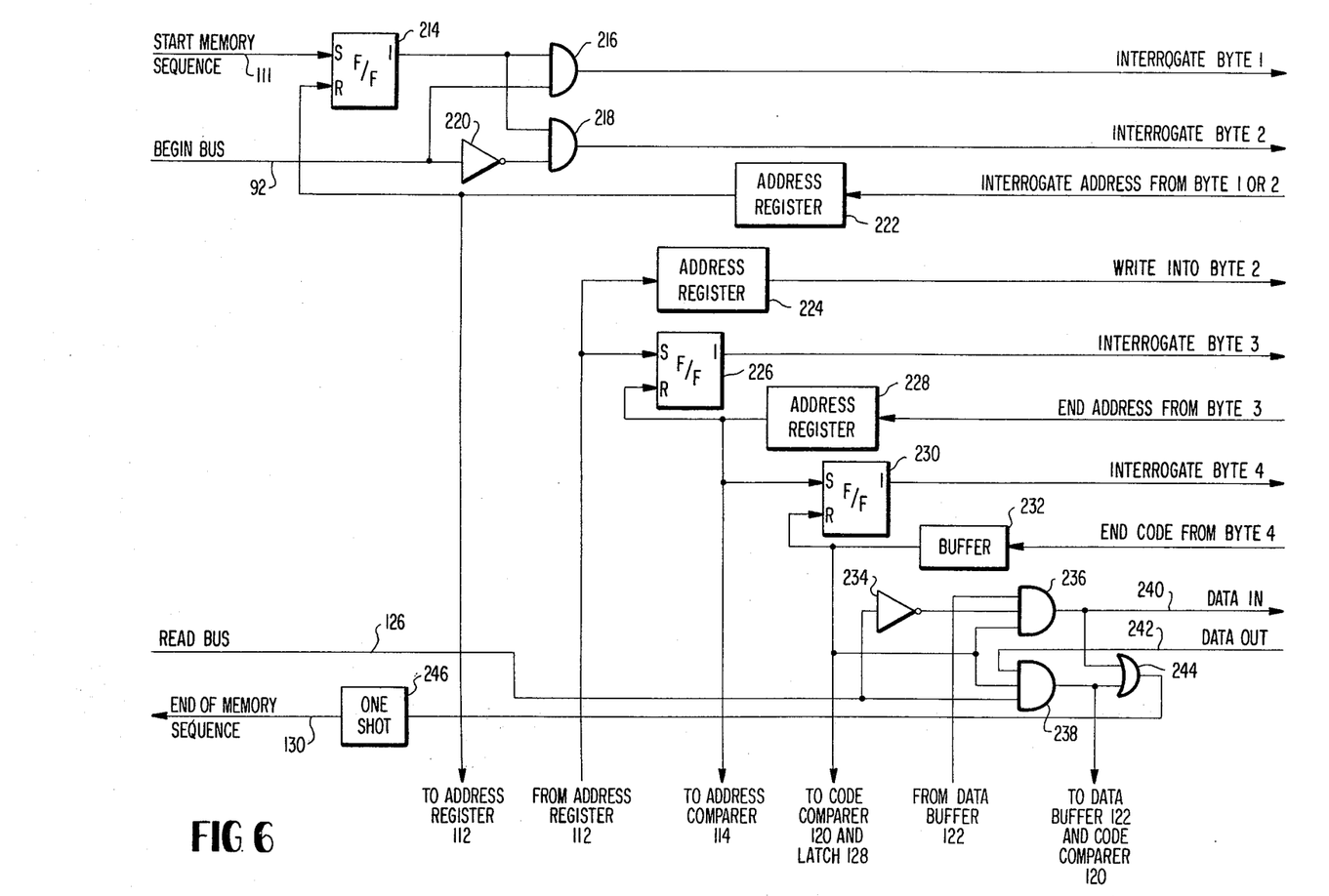

Memory access sequencer 110 can likewise be any suitable circuitry, such as a series of gates and stepping switches to enable the gates in the proper sequence. FIG. 6 illustrates one mechanization of sequencer 110. The Start Memory Sequence signal on line 111 sets flip-flop 214, the one output of which is applied as an input to AND gate 216 and as an input to AND gate 218. The Begin signal from begin bus 92 is applied to the second input of AND gate 216 and is applied through inverter 220 to the second input of AND gate 218. Consequently, if the Begin signal is present on bus 92, the Start Memory Sequence signal causes an output from AND gate 216 which is applied to memory 32 to cause interrogation of byte one of memory portion 105. If the Begin signal is not present on bus 92, the Start Memory Sequence signal causes an output from AND gate 218 which is applied to memory 32 as the signal to interrogate byte 2 of memory portion 105. The address received from memory 32 in response to the interrogation of either byte 1 or byte 2 is applied to address register 222 which in turn applies it to address register 112. Output of this address from register 222 also resets flip-flop 214. After address register 112 has incremented the address applied to it by one, it returns the new address to address register 224 which writes this address into byte 2 of memory portion 105 and enables that memory location for the transfer of a data character. Receipt of this incremented address sets flip-flop 226 which applies a signal to interrogate byte 3 of memory portion 105. The end condition address from byte 3 is applied to address register 228. The address from register 228 is applied to address comparer 114, and this output causes flip-flop 226 to be reset and flip-flop 230 to be set. The output of the flip-flop 230 interrogates byte 4 of memory portion 105. The end code read from byte 4 is applied to buffer 232 which resets flip-flop 230 and applies the end code to the end code comparer 120 and latch 128. If data is to be read from memory 32, a signal on read bus 126 is applied to inverter 234, the output of which is connected as an enabling input to AND gate 236. The signal on read bus 126 is also applied as an enabling input to AND gate 238. The output signal from buffer 232 is applied to the second enabling input of both gate 236 and gate 238. Data from data buffer 122 is applied to the signal input of AND gate 236. Data out line 242 from memory 32 is connected to the signal input of AND gate 238. If data is to be written into memory 232, there is no signal on read bus 126, and so gate 236 is enabled while gate 238 is inhibited. The data from data buffer 122 passes through gate 236 to data in line 240 to memory 32 in which the data is stored in the location within portion 107 that is indicated by the new address written into byte 2. If data is being read from memory 32, the signal on bus 126 inhibits gate 236 and enables gate 238 so that the data on data out line 242 from memory 32 passes through gate 238 to data buffer 122 and code comparer 120. Transmission of data on either data in line 240 or data out line 242 causes a signal to pass through OR gate 244 to trigger one-shot 246 which generates the End of Memory Sequence signal on line 130.

If desired, rather than storing an end condition address, byte 3 of memory portion 105 can store a count signal for comparison with the difference between the beginning address in byte 1 and the current address in byte 2 to terminate the data message after transfer of a particular number of data characters.

Again, FIG. 6 is only one possible approach to implementation of memory access sequencer 110, and primarily sets forth the logic. Other approaches are possible and may be preferred due to design optimization. Likewise, design optimization may make desirable use of time delays, isolation diodes, etc., as is well known in the art. The circuitry depicted in FIG. 6 accommodates communication between one controller 16 or 17 and its memory portion 105. Either similar circuitry can be provided for use with each controller 16 or 17, or the output lines to memory 32 can be gated by the Number Selected signals on lines 108 to the corresponding memory portions.

The technique illustrated in FIGS. 3–6 in which a portion of data memory 32 is assigned for storage of address information relating to each device controller 16 and 17 and a portion of the data memory 32 is assigned for storage of control information relating to data transfers of each device controller 16 and 17 results in numerous advantages. CPU 26 is not required to store or execute so many control commands. Controllers 16 and 17 need not include circuitry for storage of address and control information and decoding of input/output instructions. CPU 26 is able to monitor progress of data transfers by interrogating memory portion 105. Address and control information can be assigned and revised by CPU 26 as the data transfer proceeds. Data transfers are accomplished as a background to the operation of CPU 26 on a memory cycle-steal basis, without significant interruption of the operation of CPU 26.

Figure 7:
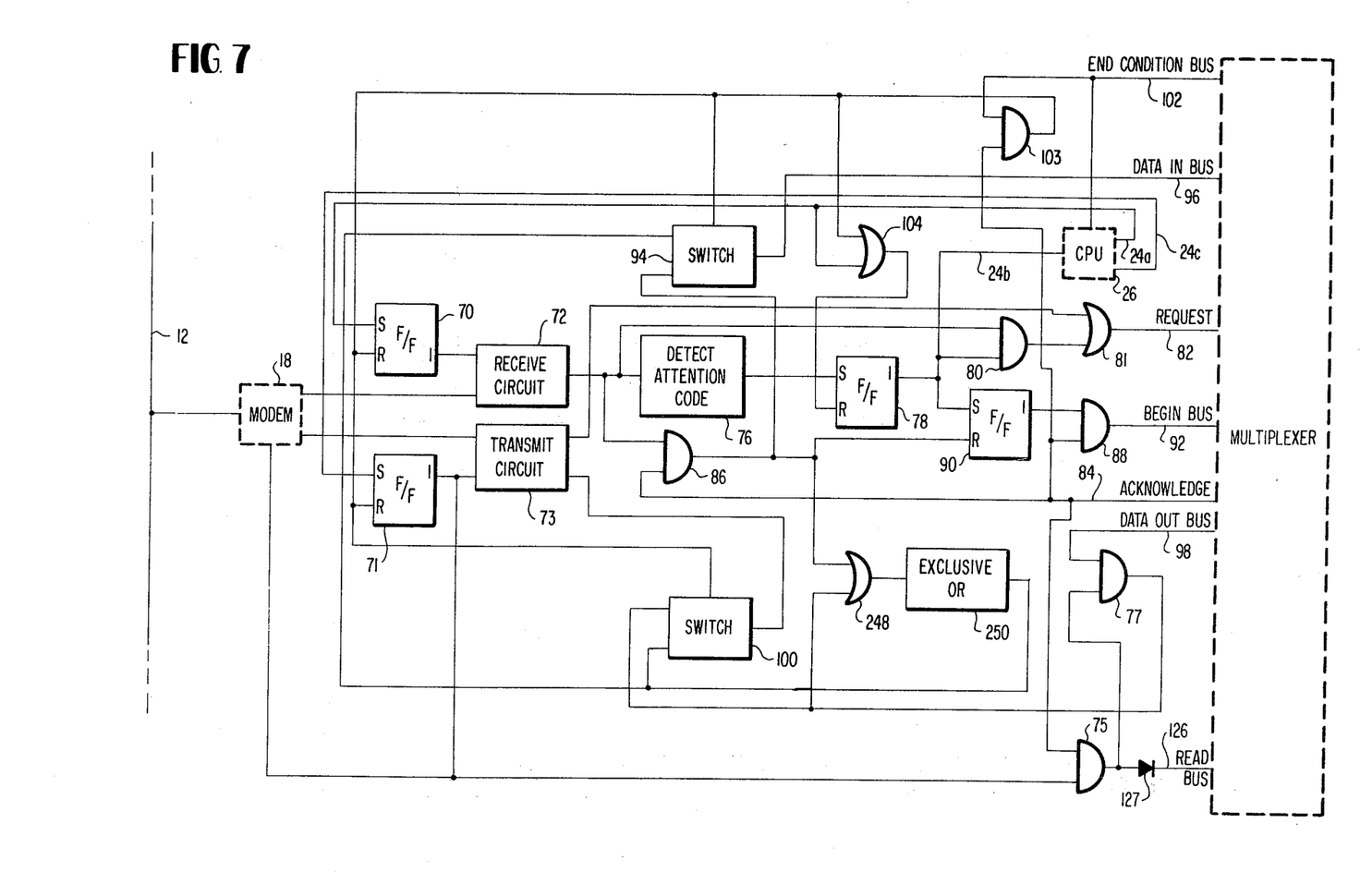
FIG. 7 is a block diagram of a communication controller suitable for use in conjunction with the present invention.

FIG. 7 illustrates in more detailed block diagram form a communications controller suitable for use as controller 16 in conjunction with a data device 10 which communicates with business machine 14 on a party line. When business machine 14 is ready to communicate through this controller 16 with the associated data device 10, CPU 26 applies a signal on line 24a which sets flip-flop 70. The one output of flip-flop 70 is applied as an enabling signal to receive circuit 72. Signals received by modem 18 from transmission line 12 might be either data characters or control characters. Each character received by modem 18 is applied to receive circuit 72. Consequently, if circuit 72 is enabled by a signal from flip-flop 70 at the time a character is received at modem 18, that character passes through receive circuit 72 to detector circuit 76 which detects the Attention character. The Attention character is, thus, detected by each controller 16 to which the transmitting data device 10 is connected in its party line hook-up and which has been enabled as a result of a signal from its CPU 26. When detector 76 detects the attention code, it sets flip-flop 78. The one output from flip-flop 78 is applied by line 24b to CPU 26 to inform the CPU of the presence of a transmission and to request handling of subsequent characters. In addition, the one output from flip-flop 78 is applied to one input of AND gate 80, the second input of which is connected to receive circuit 72. Subsequent signals from receive circuit 72 thus pass through AND gate 80 and OR gate 81 to request line 82 to multiplexer 22 as requests for handling of signals. The request signal on line 82 thus identifies to multiplexer 22 which of its controllers 16 or 17 has a character available for processing. If multiplexer 22 is available to process characters from this controller 16, the multiplexer sends back an Acknowledge signal on line 84 which is connected to one input of AND gate 86 and to one input of AND gate 88.

The output of flip-flop 78 is also applied to the set input of flip-flop 90, the one output of which is connected to the second input of AND gate 88. The output of AND gate 86 is connected to the reset input of flip-flop 90. The flip-flops inherent switching time is such that the Attention character has ended before flip-flop 78 achieves its set condition. Consequently, the presence of the Acknowledge signal on line 84 while flip-flop 90 is set causes AND gate 88 to apply a Begin signal on begin bus 92, which is common to all controllers 16 and 17, to indicate that the next character to be processed is the beginning of a message. The second input of AND gate 86 is connected to the output of receive circuit 72 and the output of AND gate 86 is connected to the quiescent input of switch 94 so that, subsequent to receipt of the Acknowledge signal on line 84, characters from receive circuit 72 are applied through switch 94, the output of which is connected to the data in bus 96, common to all the controllers 16 of this machine 14, for input of data to multiplexer 22. Acknowledgement of the first character after the Attention character causes a signal from AND gate 86 to reset flip-flop 90, terminating the Begin signal until the next Attention character is detected. Subsequent characters do not activate attention detector 76 but pass through gates 80 and 81 to become Request signals, and each time an Acknowledge signal is received, the data characters pass through AND gate 86 and switch 94 to data in bus 96. When the business machine 14 determines that a condition has been met which should terminate the transmission, then a signal is applied by mutliplexer 22 to end condition bus 102 which applies the signal to one input of AND gate 103, the second input of which is connected to Acknowledge line 84. Consequently, if this controller has been transmitting a character when the end condition is found, the End Condition signal is applied to components of this controller. The output of AND gate 103 is connected to the reset input of flip-flop 70. Consequently, upon receipt of the End Condition signal on bus 102, receive circuit 72 is no longer enabled to pass signals from modem 18. Bus 102, which is likewise common to all controllers 16 of the business machine 14, also applies the End Condition signal to CPU 26 to advise the CPU that an end condition has occurred.

In a transmission from a data device 10, the address of the business machine 14 for which the message is intended follows the Attention character. That address is applied to multiplexer 22 on data in bus 96. Multiplexer 22 applies the Address character to memory 32, and CPU 26 examines the Address character to determine whether the address is the same as that of the business machine 14. If so, transmission continues. If not, CPU 26 aplies a signal on line 24a which passes through OR gate 104 to reset flip-flop 78, removing the enabling input from AND gate 80 and removing the signal on line 24b to CPU 26. Termination of the Request signal from AND gate 80 to multiplexer 22 causes the multiplexer to terminate the Acknowledge signal on line 84, thus removing the enabling input from AND gate 86 so that characters are blocked from switch 94 and data in bus 96. Having CPU 26 evaluate the address permits CPU 26 to assign and reassign the address of its business machine, as desired, and CPU 26 can do this in response to signals sent the business machine from data device 10, from a program, from a local input, or other source.

If the address character indicates that the message is for this business machine 14, AND gate 86 remains enabled, and so the data characters pass to data in bus 96 for subsequent handling within this business machine 14. When the business machine 14 determines that a condition has been reached which should end the transmission, a signal on end condition bus 102 passes through AND gate 103 and resets flip-flop 70, removing the enabling input from receive circuit 72. The End Condition signal on bus 102 and gate 103 also passes through OR gate 104 to reset flip-flop 78 to terminate the Request signal on line 82. In response, multiplexer 22 terminates the Acknowledge signal on line 84, and so AND gate 86 blocks subsequent signals from data in bus 96. Once CPU 26 is again ready to handle signals from this controller 16, it again applies a signal on line 24a to set flip-flop 70.

When data is to be transmitted from this business machine 14 to a data device 10 on the party line, CPU 26 applies a signal on line 24c to set flip-flop 71, the one output of which is applied as an enabling input to transmit circuit 73. In response, transmit circuit 73 sends a signal through OR gate 81 to request line 82. The one output of flip-flop 71 is also applied to modem 18 to prepare the modem for transmission rather than reception. In addition, the one output of flip-flop 71 is applied as one input to AND gate 75, the second input of which is connected to acknowledge line 84. Consequently, when the request on line 82 is acknowledged on line 84, AND gate 75 applies the Read signal on read bus 126 to multiplexer 22. The Read signal is also applied to AND gate 77 which receives at its second input the data characters on data out bus 98 as those data characters are read from memory 32 through multiplexer 22. Since read bus 126 is common to all controllerss 16 and 17, isolating diode 127 is provided between the junction of the AND gate 77 input and multiplexer 22 to assure that gate 77 is not enabled by a Read signal generated in another controller 16 or 17. The data characters on data out bus 98 pass through AND gate 77 to switch 100 which applies them through transmit circuit 73 and modem 18 to transmission line 12. Again, a signal on end condition bus 102 resets flip-flop 71 to terminate the transmission.

Code detector 76 can be any suitable piece of equipment such as a plurality of gates having their enabling inputs coded with the attention code so that receipt of this code passes the gates. Receive circuit 72 and transmit circuit 71 can likewise be any suitable pieces of equipment, for example a plurality of storage buffers for storing signals and a plurality of gates enabled by the output of flip-flop 70 or 71, respectively, to pass signals so stored in those storage circuits. Other circuitry could, of course, be used for any of these components.

As illustrated in FIG. 2, each character includes a plurality of binary bits, for example seven bits, and these bits are transmitted in parallel for each character. Consequently, while FIG. 7 represents the logic of communications controller 16, suitable circuitry for this parallel transmission must be provided.

The data devices 11 which are not connected in party-line to business machine 14 do not require all the features of controller 16 as shown in FIG. 7. When a character is applied by a data device 11 to its controller 17, that controller 17 applies a request for access on its request line 82 to multiplexer 22. When multiplexer 22 responds by applying a signal on the acknowledge line 84 associated with that controller 17, the controller 17 applies its data character on data in bus 96. If the data character is the first data character of a message, the controller 17 applies a signal on begin bus 92. If CPU 26 wants a data device 11 to receive data from business machine 14, CPU 26 applies a signal to the associated controller 17 to cause the controller 17 to apply a request on its request line 82. When multiplexer 22 then applies a signal on acknowledge line 84, the controller 17 applies a signal on read bus 126 to indicate that it is to read data from memory 32 rather than to write data into the memory. Data characters received on data out bus 98 are then applied by that controller 17 to its data device 11. When multiplexer 22 determines that either the end address condition or the end code condition has been encountered, the multiplexer applies a signal on end condition bus 102 to the controller 17 to terminate the transmission. It can thus be seen that controller 17 has many capabilities in common with controller 16, the principle difference being elimination of the capability of handling the Attention character utilized on the party line. Consequently, the controllers 17 differ from FIG. 7 primarily by omitting attention detector 76, flip-flop 78, AND gate 80 and associated circuitry.

Figures 8, 9:
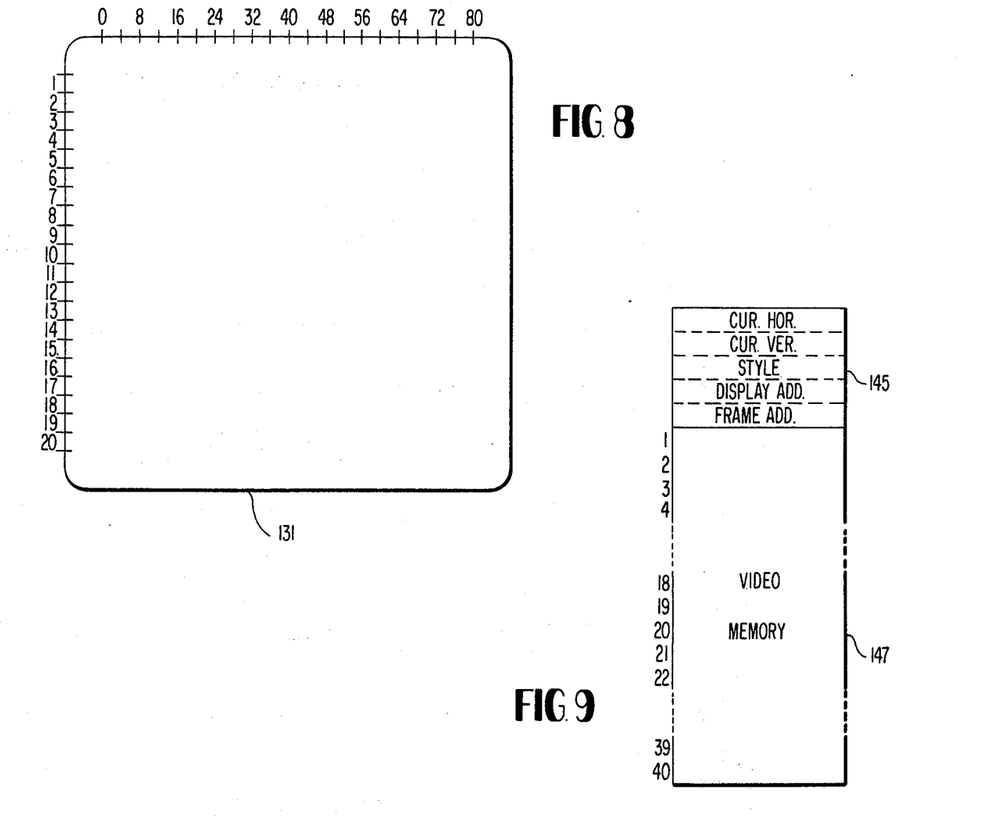
FIG. 8 illustrates a cathode ray tube type video display suitable for use in conjunction with the present invention.
FIG. 9 illustrates the layout of a memory suitable for use in conjunction with a video output processor in accordance with the present invention.

FIG. 8 illustrates the display screen of CRT 50. As there shown, the display screen 131 includes 20 horizontal text lines, designated 1-20, each of which includes 80 character spaces designated 1-80. The display screen 131 can thus display at one time a frame of up to 1600 characters.

FIG. 9 illustrates diagrammatically the portion of memory 32 associated with the video display. Preferably, the display on screen 131 includes a cursor which is an underscore beneath the character space whose memory location within memory 32 is being accessed by CPU 26. Bytes 1 and 2 of video control portion 145 of memory 32 store respectively the cursor horizontal position and the cursor vertical position. Byte 3 stores bits controlling the style of the display. By way of illustration, the bits of byte 3 can control blinking of the cursor, blinking of tagged characters, reversal of tagged characters (black on white, rather than the usual white on black), intensity of tagged characters, etc. Byte 4 stores the address of the location within main video memory portion 147 at which is stored the first character of the entire display, while byte 5 stores the address of the location within main video memory portion 147 at which is stored the first character to be displayed in the current frame.

FIG. 9 illustrates main video memory portion 147 as including 40 rows of storage locations, each capable of storing 80 characters. The address of the first character position of row one is stored in byte 4 of video control portion 145, and when the display is first started that same address is stored in byte 5 of portion 145, and the character stored at that address is displayed in the first character position of row one on screen 131.

Scrolling of the display is achieved by having CPU 26 increment the frame address memory in byte 5 by eighty, for example one such eighty character incrementing occurring each second. Consequently, scrolling takes place substantially instantaneously since the data is not moved to a new storage location in memory 32, but instead the address of the storage location at which the display commences is incremented.

Figure 10:
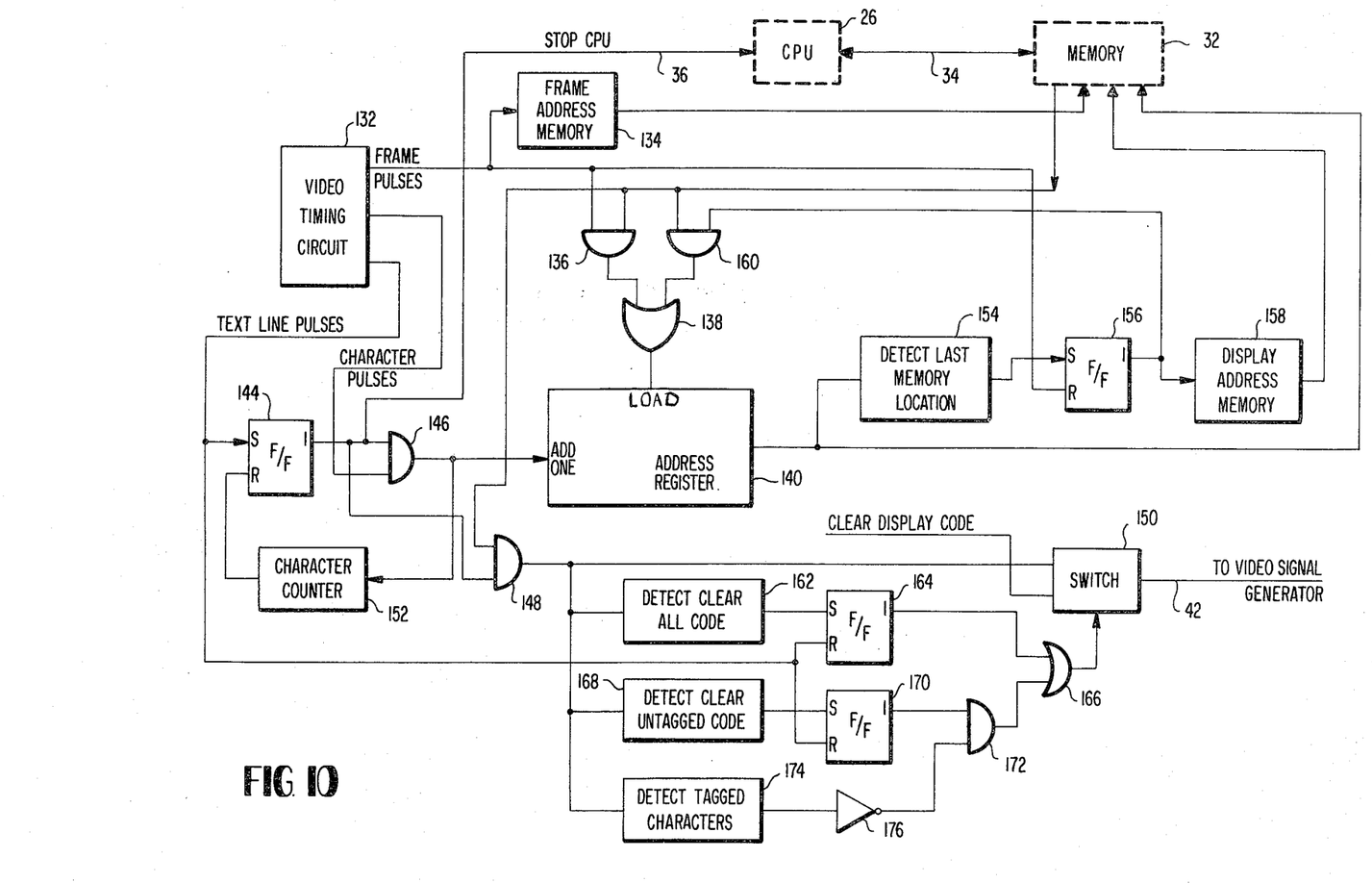
FIG. 10 is a block diagram of a video output processor suitable for use in a system in accordance with the present invention.

FIG. 10 illustrates circuitry suitable for video output processor 38 to provide on display screen 131 a display of data characters. Video timing circuit 132 provides timing pulses to coordinate operation of the video output processor. Timing circuit 132 thus might include a crystal controlled oscillator clock and a plurality of dividing circuits to provide pulses at the desired intervals. If the display on display screen 131 is to include, for example, twenty text lines of 80 characters each, as illustrated in FIG. 8, then video timing circuit 132 provides character pulses at the time each character is to be applied to screen 131, text line pulses marking the end of each text line, and frame pulses marking the end of each video frame. In addition, if the text lines are made up of a number of scan lines, video timing circuit 132 also provides scan line pulses marking the end of each scan line.

Frame address memory 134 stores the address of memory byte 5 in portion 145 of memory 32. Video timing circuit 132 applies a frame pulse to frame address memory 134 at the end of each display frame. In response to this pulse, frame address memory 134 interrogates memory byte 5. Memory byte 5 contains the address of the storage location in memory portion 147 at which is stored the first character to be displayed in the next frame. Memory 32 applies that address to AND gate 136. The frame pulse from video timing circuit 132 is also applied to gate 136, and so the address passes through AND gate 136 and through OR gate 138 to address register 140. The text line pulse from video timing circuit 132 which occurs at the end of the last text line of the frame sets flip-flop 144. The one output of flip-flop 144 enables AND gate 146 to pass character pulses from video timing circuit 132 to increment address register 140 so that upon display of each character, the address register is incremented to contain the address of the location within memory portion 147 within which is stored the next character to be displayed.

The output of address register 140 is applied to memory 32 to interrogate the memory location within memory portion 147 identified by that address. The data character contained in that memory location is applied by memory 32 to AND gate 148 which is also enabled by the one output of flip-flop 144. Consequently, the character from memory 32 passes through gate 148 to switch 150 which applies the character on output line 42 to video signal generator 44.

If the display device utilized is one which requires a number of scan lines to display each text line, then the character pulses passing through AND gate 146 are applied to character counter 152. When counter 152 has counted the number of characters in each display line (e.g. 80 character pulses), counter 152 resets flip-flop 144 so that address register 144 is not incremented until the start of the next video text line. In such a situation, video signal generator 44 is provided with an 80 character buffer storage to store the text line of characters until all of the scan lines have been completed, at which time a text line pulse sets flip-flop 144 to cause passage of the next 80 characters from memory 32, through AND gate 148 to the buffer storage of video signal generator 44.

As stated, scrolling of the display is achieved by CPU 26 incrementing the address in byte 5 of memory portion 145 by 80 so that the first data character of the next text line starts the display. This continues at the desired scrolling speed. When the address in byte 5 equals or exceeds the last character address, byte 5 is caused to store the group address which is also in byte 4. When the address of the last character of the last text line of the entire display is within address register 140, the last character of the display is then presented on display screen 131. The initial text line of the display can be returned to screen 131 beneath the last display text line. To accomplish this, the output of address register 140 is connected to detector circuit 154, and when detector 154 detects that the address in address register 140 is the address of the last text character of the entire display material (i.e., the address of the last character in row 40 of portion 147), detector 154 sets flip-flop 156. Group address memory 158 stores the address of byte 4 within portion 145. Byte 4 stores the address of the storage location in memory portion 147 at which is stored the first display character for the entire group. The one output of flip-flop 156 causes the group address memory 158 to interrogate byte 4, and in response memory 32 applies to AND gate 160 the address of the first character of the entire group; i.e. the address of the first character storage location of row one within portion 147 of memory 32. Flip-flop 156 enables gate 160, permitting this address to pass through AND gate 160 and OR gate 138 to address register 140. Consequently, the next text line on screen 131 is the first text line of the entire group. If it is desired to clear the screen beneath the last text line of the group as the group is scrolled upward, then instead of having the address of byte 4 loaded into it, memory 158 has loaded into it an address at which is stored code characters causing a clear display, or byte 4 can store an address at which such code characters are stored. Memories 134 and 158 can be hard-wired or loaded via CPU 26 or memory 32.

When the display screen is to be cleared, the Clear All Spaces code character is applied by CPU 26 to the memory locations within portion 147 associated with the first character position of each text line. When that code character passes from memory 32 through gate 148, the code is detected by detector 162 which sets flip-flop 164. The one output of flip-flop 164 passes through OR gate 166 to the control input of switch 150 so that, rather than applying the output of AND gate 148 to output line 42, switch 150 applies the space code character to which video signal generator 44 responds by applying a blank space in the character position. Flip-flop 164 remains set until the text line pulse from video timing circuit 132. Consequently, the balance of that text line is filled with blank spaces. If the first character space of the next text line is also the character causing a clearing of all spaces, flip-flop 164 is again set.

Figure 11:
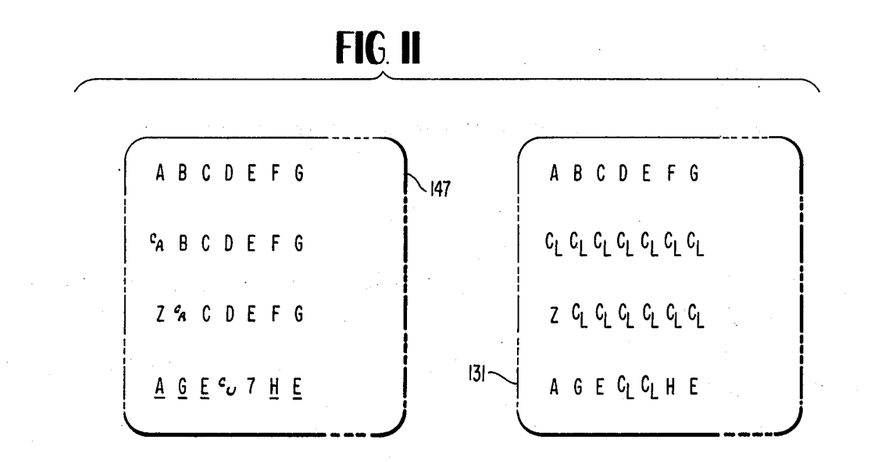
FIG. 11 illustrates the screeen clearing technique in accordance with the present invention.

As new data is written into the memory locations of memory portion 147 to replace the data being cleared from screen 131, CPU 26 first causes the Clear All Spaces code character to be written into the memory location of the next contiguous character space and then causes the new data character to be written in. As a consequence, each new character is displayed as it is written in, with the balance of the text line still cleared. This is illustrated in FIG. 11 in which the memory storage locations of memory portion 147 are shown in correspondence with the character locations on display screen 131. The first text line illustrated in FIG. 11 is all text characters, and the text characters stored in the locations of memory portion 147 are displayed in the corresponding character spaces of display screen 131. The next text line illustrated in FIG. 11 has had stored in the first character location the code character to clear all spaces. As a consequence, when that character is passed through AND gate 148, flip-flop 164 is set, and that entire text line on screen 131 is cleared. The next text line illustrated in FIG. 11 has had a new data character written into the first character storage location of memory portion 147. As a consequence the clear all spaces code character has been written into the second character storage location of that text line. Therefore, on display screen 131 the new data character appears in the first character position, while the balance of the text line is clear. Consequently, in order to clear the screen it is only necessary that CPU 26 apply the code character to clear all spaces into the memory locations of the first character position of each text line with memory portion 147.

In like manner, if variable data is to be cleared from the display, while fixed data is to remain on the display, one of these types of data can be tagged while the other is untagged. Various types of tagging might be utilized in this conditional clearing.

In FIG. 10 CPU 26 applies to the memory location of the first character position which is to be cleared in each text line a code character causing the clearing of untagged data characters. The code character indicating that untagged characters are to be cleared is detected by detector 168 which sets flip-flop 170. The one output of flip-flop 170 is applied to one input of ANd gate 172. The data characters are also applied to tag detector 174. Characters not having the tagging characteristic cause no output from tag detector 174, and so inverter 176 applies a signal to the second input of AND gate 172. In response, a signal passes through OR gate 166 to the control input of switch 150, causing switch 150 to apply the clear display code to output line 142. When a tagged character is detected, an output from detector 174 is applied to inverter 176, and, as a consequence, gate 172 is blocked, with the result that no control input is applied to the switch 150. Consequently, switch 150 applies that data character from the output of AND gate 148 to output line 42.

This conditional clearing of only variable data characters is also illustrated in FIG. 11. The last text line illustrated in FIG. 11 represents a line from a form having as illustrative headings "AGE" and "HEIGHT", with spaces for entry of data following each heading. The characters of the heading are tagged to protect them from clearing, and this is indicated in the representation of memory portion 147 in FIG. 11 by underscoring the tagged characters. The code character to cause conditional clearing of display screen 131 by clearing untagged characters is entered by CPU 26 into the first unprotected character location. As a consequence, when that character passes AND gate 148, flip-flop 170 is set, and so for the balance of that text line untagged characters are cleared from display 131. When a tagged character, such as the character H, which is underscored in that text line of FIG. 11, is passed by gate 148, detector 174 activates inverter 176 to inhibit gate 172, and so switch 150 passes the H character from gate 148 with the result that, as shown on display screeen 131 of FIG. 11, the tagged characters of the text line are displayed while the untagged characters are cleared. Again, with each new character written into memory portion 147, the clear untagged code character is written into the next untagged character location. Thus, by simply inserting a coded control character into the memory location of memory portion 147 associated with the first character position to be cleared from each display line, the entire display line is cleared, in either an unconditional or a conditional mode, giving an improvement in the time required for clearing of the display screen of approximately 80 to one over systems requiring that the entire memory be cleared to clear the display.

The tagging characteristic utilized might be any of several. By way of examples the tagging characteristic might be an additional data bit in tagged characters, a particular combination of data bits in tagged characters, the absence of a particular data bit in tagged characters, or a particular sequence of data characters to indicate that subsequent data characters are not to be cleared followed by another particular sequence of data characters to indicate that subsequent data characters are to be cleared. Other tagging characteristics could, of course, be utilized.

The output from video output processor 38 is applied to video signal generator 44 which also receives character number and text line number signals from video timing circuit 132. Video signal generator 38 includes a code converter such as a read only memory for converting the coded characters to character representations, the necessary horizontal and vertical synchronization generators, and a parallel-to-serial converter, together with a two-state generator the output of which is applied with the outputs of the synchronization generators to appropriate mixing circuitry to provide the desired composite video output signal which contains horizontal synchronization information, vertical synchronization information, and two-state signal information. This composite video output signal is applied by output line 46 to CRT 50 to cause the desired display. If a display made up of scan lines is to be generated, then video signal generator 38 also includes a buffer storage for the characters of a text line to store those characters while their text line is being scanned.

It is desirable to have in any data transmission system a means for assuring detection of erroneous characters in the event noise during the transmission causes an error such as the losing of a data bit or the generation of erroneous data bit. One well known means of accomplishing such a check is, of course, the parity check. Another means frequently utilzed for checking the correctness of data transmission is a block check character, such as a longitudinal redundancy character which is a parity check of the corresponding bit position in every data character.

FIG. 2 illustrates a brief transmission. The transmission commences with the attention code which is in binary form 0000100, an address code, illustrated as 0110011, followed by the start of text code 0000010. This is followed by the data characters being transmitted. After the last data character, the end of text code 0000011 is transmitted. The block check character is formed by determining the number of binary ones in the respective bit positions of all of the data characters in the transmission and in the end of transmission character and forming a new character which results in the total number of ones for each respective bit position being an even number. Thus, in the illustrative example of FIG. 2, the first bit positions of the several data characters and the end of transmission character are, respectively, 010011. Since there are three ones in the first bit position, the first bit position of the block check character is a one to result in there being an even number of first bit position ones. In the second bit position of the data characters and the end of transmission character, there are two ones, and so the second bit of the block check character is zero. In the third bit position there are four ones, and so the block check character has a zero in its third bit position. Likewise, in the fourth bit position there are four ones, and so the fourth bit of the block check character is a zero. The fifth and sixth bit positions are all zeros, and so the fifth and sixth bits of the block character are zero. The seventh bit position of the data characters and the end of transmission character have five ones, and so the seventh bit of the block check character is a one to give an even number of ones in the seventh bit position. The block check character is thus 1000001. A standard check of transmission accuracy is thus performed by having the data receiver determine the block check character and compare it with a block check character transmitted from the data source. If a comparison is found, then it is assumed that no error exists. If the two block check characters do not compare, then it is known that an error took place, either in the transmission of the data or in the transmission of the block check character itself. In either event the transmission can be repeated to assure that the correct message is received. This utilization of the block check character requires circuitry or CPU capacity to detect the start of text character and the end of text character and circuitry to count the number of ones in each bit position. Considerable time or equipment is expended in making this count, determining the block check character, and comparing the result with the received block check character, and considerable circuitry is required for detection and counting. This becomes even more complex when the transmitted message is lengthy. This check can be performed partially within CPU 26 and partially by circuitry of business machine 14 at a savings of cost and time.

FIG. 7 illustrates circuitry within controller 16 providing one manner to determine a modified block check character capable of performing this check with less complex circuitry and more rapidly. All of the characters received following the attention character, including the address character, the start text character, the data characters, the end of text character, and the received block check character pass from receive circuit 72 and AND gate 86 through OR gate 248 to exclusive OR circuit 250. The output of exclusive OR circuit 180 is applied to the second input of switch 94 and to the second input of switch 100. The output of exclusive OR circuit 250 is the modified block check character which is a parity check character determined for all the transmitted data characters, including the address, start of text, end of text and received block check characters. The modified block check character of the transmission of FIG. 2 is illustrated in FIG. 2 and designated MOD. As can be seen, in the first bit position for all the characters from the address character through the received block check character there are an odd number of ones, and so the first bit of the modified block check character is a one. In that manner it is determined that the modified block check character is 0110001.

During reception of data characters, when the end of text character is received, a signal on end condition bus 102 activates switch 94 to apply the output of exclusive OR circuit 250 to data in bus 96. Consequently, rather than storing the received block check character, memory 32 stores the modified block check character. CPU 26 then determines a compensating block check character which is the block check character of the characters which are not included in the true block check character, for example the address and start of text characters, and this compensating block check character should be identical with the modified block check character. If an error is found, CPU 26 generates an error signal.

When data is to be transmitted, CPU 26 loads memory 32 with the address character, the start of text character, all the data characters, the end of text character, and the modified block check character. After transmittal of the end of text character, a signal on end condition bus 102 activates switch 100 so that rather than the modified block check character from data out bus 98, the output of exclusive OR circuit 250 is transmitted. This is the block check character of everything which CPU 26 loaded into memory 32 for transmission, including the modified block check character, and is the true block check character of only the data characters and the end of text character.

CPU 26 can be any suitable microprocessor, for example, a silicon gate MOS 8008 from Intel Corporation of Mountain View, California. Memory 32 likewise can be any suitable random access memory.

The foregoing description of the business machine of the present invention has been with reference to logic required for its operation and has been set out in a manner explanatory of that operation. Implementation of this logic, of course, is likely to result in design optimization which may make certain components unnecessary or other components desirable. By way of illustration, the flip-flops are depicted as having an inherent operating time such that transmission of singals throughout the system occurs before the flip-flops switch state. Use of delays may be desirable to assure no difficulties arise if the flip-flops are found not to meet the requirements. Other such implementation adaptions may also be found desirable. In addition, the several bits of each data character are generally transmitted in parallel, and so although the logic diagrams of the drawings show one line for transfer of characters, parallel transmission of the several bits is intended. While business machine 14 has been illustrated as accommodating four data devices 10 and 11, any number might be accommodated.

Although the present invention has been described with reference to a preferred embodiment, numerous modifications and rearrangements could be made, and still the result would be within the scope of the invention.

We claim:
1. In a method of transferring coded characters including in sequence at least one initial control character, a plurality of data characters, an end control character, and a true block check character wherein normally the true block check character is derived from the plurality of data characters and the end control character, the improvement comprising the steps of:
   a. forming a modified block check character from initial control characters, the data characters, the end control character and the true block check character;
   b. forming a compensating block check character from all transferred characters normally not included in the true block check character;
   c. combining the modified block check character with the compensating block check character; and
   d. generating an error signal in the event the result of step (c) indicates an incorrect transfer.
2. A method as claimed in claim 1 in which each block check character is a longitudinal redundancy character.
3. A method as claimed in claim 2 in which step (c) is performed by applying the result of step (a) and the result of step (b) sequentially through an exclusive OR circuit.

* * * * *